May 31, 1927.
J. W. WOODRUFF
FORCE FEED LUBRICATOR
Filed Dec. 23, 1924
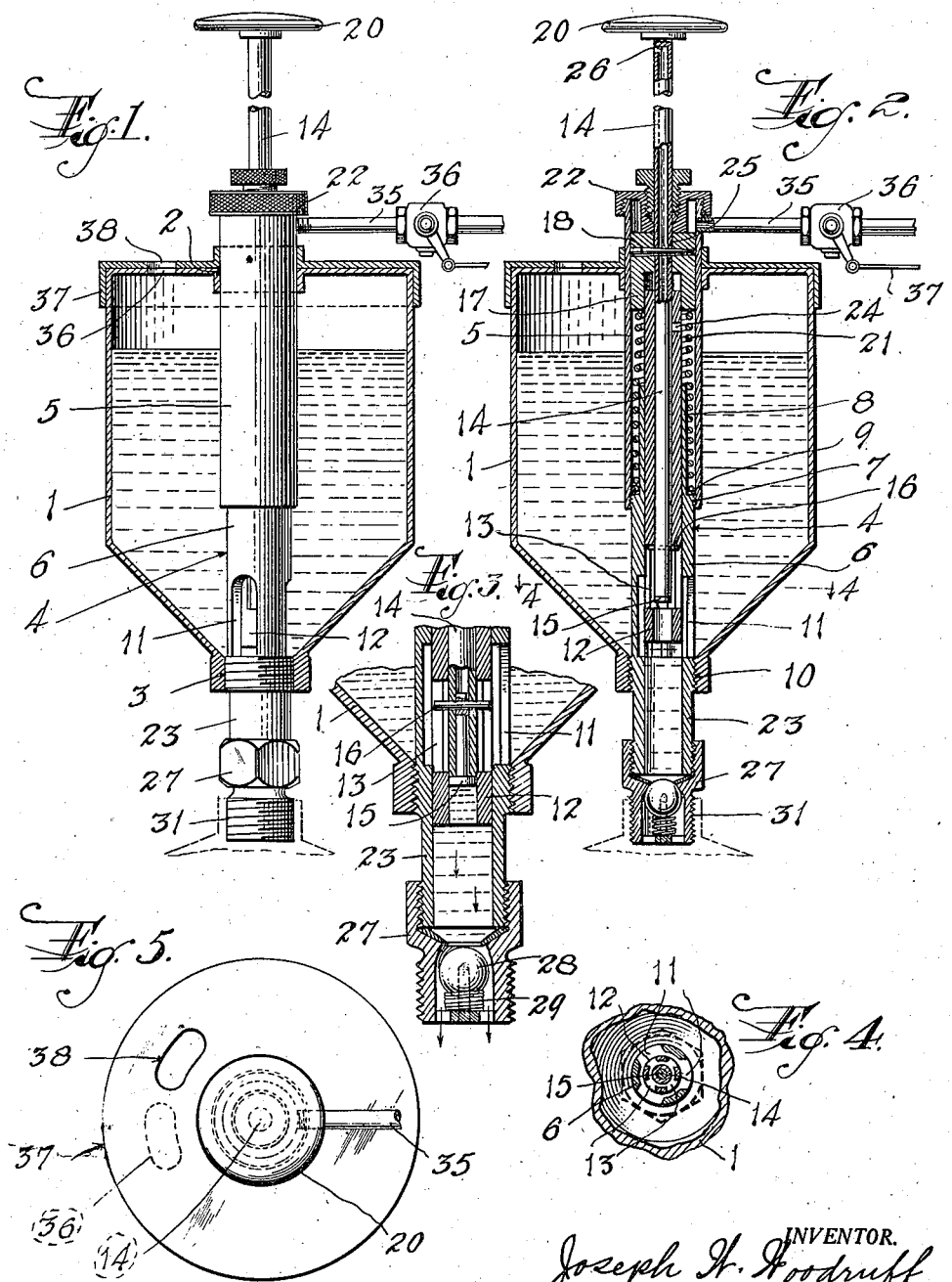
INVENTOR.
Joseph W. Woodruff
BY
ATTORNEYS.

Patented May 31, 1927.

1,630,321

UNITED STATES PATENT OFFICE.

JOSEPH W. WOODRUFF, OF ELIZABETH, NEW JERSEY.

FORCE-FEED LUBRICATOR.

Application filed December 23, 1924. Serial No. 757,618.

This invention relates in general to a lubricating device of the type in which the lubricant is discharged from the device by force, as by a follower piston operated manually or by power such as compressed air. More particularly the invention relates to such a device especially adapted for use with heavy or unusually viscous greases, oils, etc., such as are used in large machinery operating under heavy loads such as sugar cane rolls and the like.

One object of the invention is to provide a lubricating device of the character described embodying novel and improved features of construction including the combination of a casing or reservoir for lubricant and a relatively small lubricant ejector for forcibly ejecting or discharging lubricant and feeding it to a machine, either manually or by power, whereby only a predetermined amount of lubricant to be ejected at any time is actually moved so that operation is rendered easy with a minimum of power, in contrast to the common type of lubricator in which the whole body of lubricant in the casing is moved upon each ejection of a small portion.

Another object is to provide such a lubricating device including a container or reservoir for lubricant, a lubricant ejector of novel and improved construction comprising a cylinder extending through and with both ends projecting from said casing and having a lateral opening in its walls within said casing and a valved piston slidable in said cylinder, whereby said lubricant may pass into said cylinder through said opening and be forcibly ejected from said cylinder by said piston.

Further objects are to provide a lubricating device of the character described including novel and improved means for actuating said piston and its valve to provide a novel and improved valve mechanism in combination with said piston to avoid production of partial vacuum by actuation of said piston; to provide in such a device novel and improved means for feeding a predetermined quantity of lubricant to a machine or the like, and to obtain other results and advantages as may be brought out by the following description.

Referring to the accompanying drawings, in which the same reference characters designate corresponding and like parts throughout the several views, Figure 1 is a vertical longitudinal sectional view through the casing of the lubricating device embodying the invention, the ejecting mechanism being shown in side elevation;

Figure 2 is a view similar to Figure 1 showing the ejecting mechanism also in section;

Figure 3 is an enlarged fragmentary vertical sectional view showing the ejecting piston in the position assumed when the lubricant is being ejected from the outlet;

Figure 4 is a horizontal sectional view taken on the line 4—4 of Figure 2, and

Figure 5 is a top plan view of the lubricating device.

Specifically describing the present embodiment of the invention, the reference character 1 designates a casing to receive the lubricant to be dispensed, for instance heavy grease, oils, etc., said casing being provided at its opposite ends with alined axial openings 2 and 3 within which is arranged the lubricant ejecting mechanism 4.

This ejecting mechanism is shown as comprising a cylinder formed of two sections 5 and 6 connected together by means of threads 7, one of the sections, in the present instance the section 6, extending into the other section and having its end reduced as at 8 to form a shoulder 9. This cylinder 5, 6 is adapted to be inserted into the casing 1 through the opening 2, and the section 6 of the cylinder is threaded at 10 in the opening 3 of the casing, the end of said section 6 projecting from the casing and forming an outlet therefor.

The section 6 of the cylinder is provided with a plurality of longitudinal slots 11 whereby communication is possible between the interior of the casing 1 and the interior of the cylinder. A piston 12 is longitudinally reciprocable in the section 6 of the cylinder and is provided adjacent one end with a plurality of openings 13 adapted to register with the openings 11 in the section 6 of the cylinder. The piston 12 is in the form of a straight-walled tube and has reciprocably mounted therein with a sliding fit a smaller valve tube 14 the inner end of which is closed in any suitable manner as by the plug 15 to form a valve and piston rod. The tube 14 is arranged for limited longitudinal movement relatively to the piston 12, said longitudinal movement in one direction being limited by a cross-pin 16 to cooperate with the ends of the slots 13, and said relative movement in the other direction being limited by a piston 17 fixed to the tube 14 by a pin 18 and loosely slidable telescopically over the adjacent end of the piston 12. With this construction, it will be observed that the piston 12 may move within the cylinder section 6 longitudinally of the openings 11, and that the tube 14 may move within the piston 12 and longitudinally of the openings 13 to act as a slide valve to control communication between said openings and the passage through said piston.

The outer end of the tube 14 is provided with an operating handle 20 by means of which the tube 14 and piston 12 may be moved in one direction, that is inwardly of the cylinder. A spring 21 is interposed between the piston 17 and the shoulder 9 to move the tube 14 and piston 12 in the other direction. Movement of the piston 17 under the influence of the spring 21 is limited by a cap 22 screwed on the outer end of the section 5 of the cylinder.

In the operation of the device so far described, the normal position of the parts is shown in Figures 1 and 2 with the ends of the valve tube 14 and the piston 12 disposed intermediate the lengths of the respective slots 11 and 13. With the parts in this position the lubricant in the casing 1 will pass through the openings 11 and 13 into the outlet portion 23 of the section 6 of the cylinder. When it is desired to eject the lubricant from the casing, the handle 20 is pushed downwardly whereupon the closed end of the valve tube 14 enters the portion of the piston 12 below the openings 13 and closes communication between said openings and the passage through the piston, as shown in Figure 3. As the handle 20 is further pushed toward the casing, the piston 17 engages the adjacent end of the piston 12 and forces the latter downwardly into the outlet portion 23 of the section 6 of the cylinder, as shown in Figure 3, until the piston 17 engages the end of reduced portion 8 of section 6. The handle 20 is then released, whereupon the spring 21 immediately withdraws the valve tube 14 from the lower end of the piston 12 which opens communication between the openings 13 and the passage through the lower end of the piston 12 and prevents the partial vacuum which would be produced in the outlet portion 23 if such action did not take place. The pin 16 then engages the ends of the slots 13, and continued distention of the spring 21 raises the piston 12 from the outlet portion 23 of the cylinder. As the piston 12 and the valve tube 14 move upwardly, the lubricant from the casing is drawn into the outlet portion 23 for the next operation.

To permit the escape of air within the cylinder 4 due to the reciprocation of the parts therein, I may provide the piston 12 with a vent 24 to permit air to pass from beneath the piston 17 inwardly between the piston 12 and the valve tube 14. From there the air escapes around the opening 25 in the tube 14 through which passes the pin 18, and the outer end of the tube adjacent the handle 20 is provided with a further vent opening 26. To prevent the lubricant being ejected from the device into a machine or the like from being redrawn into the casing upon retraction of the piston 12, I preferably provide on the outer end of the section 6 of the cylinder a check valve which may include a casing 27 threaded on the section 6 and carrying a ball check valve 28 normally influenced by a spring 29 against a seat 30 so as to prevent flow of lubricant inwardly of the cylinder 4 through the outlet end thereof. The casing 27 is preferably formed with screw threads 31 for securing the lubricating device to a machine or the like which it is desired to lubricate.

It may be desirable in some instances to automatically actuate the lubricating device by power. For this purpose I have shown a pipe 35 connected to the projecting end of the section 5 of the cylinder 4 above the piston 17, said pipe having connected therein a two-way valve 36 adapted to be automatically operated from a machine through a connecting link or other suitable means 37 to intermittently admit air under pressure into the cylinder above the piston 17. It will be obvious that when the air is admitted into the cylinder 4 the piston 17 will be forced downwardly just as it is when operated from the handle 20, as above described, and when the air supply is shut off and that in the cylinder permitted to escape by the valve 36, the spring 21 will return the parts to their normal positions, as above described.

Preferably the upper end of the casing 1 is provided with a filling opening 39 adapted to be closed by a cover 40 rotatable on the end of the casing about the cylinder 4, the cover being provided with an opening 38 to register with the opening 39 when it is desired to fill the casing.

It will be observed that with this construction only as much of the lubricant as it is desired to eject is moved by the ejecting mechanism at any one time so that a minimum of power is necessary. Thus, a large casing or container for a lubricant can be utilized with a relatively small ejecting mechanism. This is particularly desirable where the lubricating device is to be used in connection with large machines, such as sugar cane rolls, etc., where unusually heavy or viscous lubricants are used and great pressures in the bearings of the machines are encountered. Also, when it is desired to clean the device it is merely necessary to unscrew the same from the machine and then the cylinder 4 from the opening 3 of the casing, the cylinder 4 being then bodily removable from the casing.

While I have shown and described the lubricating device as embodying certain details of construction, it will be understood that this is mainly for the purpose of illustrating the principles of the invention and that many modifications and changes may be made in the details of the construction without departing from the spirit or scope of the invention. Therefore, I do not desire to be understood as limiting myself except as required by the following claims when construed in the light of the prior art.

Having thus described the invention, what I claim is:

1. A device of the character described, comprising a cylinder having an inlet and an outlet, a piston reciprocable with a sliding fit in said cylinder between said inlet and said outlet, said piston having an opening to establish communication therethrough between said inlet and outlet, a valve rod having a limited reciprocatory movement relative to said piston in opposite directions and a sliding fit in said opening to close and open the same means on said valve rod above said opening in the piston to have an abutting engagement with said piston to limit relative movement of said piston and said valve rod in the direction to close said opening and cause movement of said piston with said valve rod after said opening is closed, and means for connecting said piston and said valve rod to limit relative movement of said piston and said valve rod in the direction to open said opening and cause movement of said piston with said valve rod in said direction after said opening is opened, whereby actuation of said valve rod in opposite directions closes and opens said opening and simultaneously actuates said piston in said cylinder.

2. A device of the character described, comprising a cylinder having an outlet at one end and an opening in its walls in spaced relation to said outlet to admit a fluid to be pumped, a tubular piston having straight interior walls reciprocable with a sliding fit in said cylinder between said opening and said outlet and having an opening through its walls to establish communication therethrough between said outlet and said opening in the cylinder, a valve rod having a limited reciprocatory movement relative to said piston and a sliding fit therein to close and to open communication between said opening and the passage through said piston upon movement of said piston in the direction to force fluid from said outlet of said cylinder and in the direction to fill said outlet with fluid respectively, and means connecting said piston and said valve rod to cause movement of said piston with said valve rod at the limits of said relative movements of the piston and the valve rod whereby actuation of said valve rod in opposite directions closes and opens communication through said opening and simultaneously actuates said piston in said cylinder.

3. A device of the character described, comprising a cylinder having an outlet at one end and an opening in spaced relation to said outlet to admit a fluid to be pumped into said cylinder, a tubular piston reciprocable in said cylinder and having an opening in its walls, a valve rod reciprocable in said tubular piston to open and close said opening in said piston, means for connecting said piston to said valve rod to permit limited movement of said valve rod relatively to said piston in opposite directions to open and close said opening and to cause movement of said piston with said valve rod after said opening has been opened or closed, a second piston in said cylinder fixedly connected to said valve rod, and means for supplying motive fluid to said cylinder to actuate said second piston and said valve rod.

4. A device of the character described comprising a cylinder having an outlet at one end and an opening in spaced relation to said outlet to admit a fluid to be pumped into said cylinder, a tubular piston reciprocable in said cylinder and having an opening in its walls, a valve rod reciprocable in said tubular piston to open and close said opening in said piston, means for connecting said piston to said valve rod to permit limited movement of said valve rod relatively to said piston in opposite directions to open and close said opening and to cause movement of said piston with said valve rod after said opening has been opened or closed, a second piston in said cylinder fixedly connected to said valve rod, means for supplying motive fluid to said cylinder to move said second piston and valve rod in one direction, and a spring for actuating said valve rod in the opposite direction.

5. A device of the character described, comprising a cylinder having an inlet and an outlet, a piston reciprocable with a sliding fit in said cylinder between said inlet and said outlet, said piston having an opening to establish communication therethrough between said inlet and outlet and having a longitudinal slot in its walls, a valve rod reciprocably mounted in said piston with a sliding fit in said opening and having a pin movable in said slot to permit limited movement of said valve rod longitudinally relatively to said piston in one direction to open said opening, and means on said valve rod arranged for limited movement relatively to and to have abutting engagement with said piston upon movement of said valve rod in the opposite direction to close said slot, whereby actuation of said valve rod in opposite directions closes and opens said opening and simultaneously actuates said piston in said cylinder.

6. A device of the character described, comprising a cylinder having an outlet at one end and an opening in its walls in spaced relation to said outlet to admit a fluid to be pumped, a tubular piston reciprocable in said cylinder and having a longitudinal slot in its walls to establish communication therethrough and the passage in said piston between said outlet and said opening in said cylinder, a valve rod reciprocable in said piston to control communication between said slot and the passage through said piston, said valve rod having a pin movable in said slot to permit limited movement of said valve rod longitudinally relatively to said piston in one direction to open the passage through said piston and said slot and to cause movement of said piston with said valve rod in the same direction thereafter, a second piston in said cylinder fixedly connected to said valve rod and arranged for limited movement relatively to and to engage the first-mentioned piston upon movement of said valve rod in the opposite direction after communication through said slot has been closed, means for supplying fluid pressure to said cylinder to actuate said second piston to close communication through said slot, and a spring for actuating said second piston in the other direction.

7. A device of the character described, comprising a cylinder having an outlet and an inlet opening in spaced relation thereto to admit fluid to be pumped, a tubular piston having straight interior walls reciprocable with a sliding fit in said cylinder between said inlet opening and said outlet and having a longitudinal slot through its walls to permit communication therethrongh and the passage in said piston between said inlet opening and said outlet in the cylinder. a valve rod having reciprocatory movement relative to said piston and a sliding fit therein to close and to open communication between said slot and the passage through said piston upon movement of said piston in the direction to force fluid from said outlet of said cylinder and in the direction to fill said outlet with fluid respectively, said valve rod having a pin movable in said slot to limit relative movement of said valve rod and said piston in the direction to open communication between said slot and said passage and to cause movement of said piston with said valve rod thereafter, and means on said valve rod to limit movement thereof relatively to and to have abutting engagement with said piston in the opposite direction, whereby actuation of said valve rod opens and closes communication between said slot and the passage in said piston and simultaneously moves said piston in said cylinder to permit fluid to flow through said inlet opening to said outlet and to eject said fluid from said outlet respectively.

JOSEPH W. WOODRUFF.